SIGNAL COUNTING APPARATUS
Filed Oct. 9, 1956
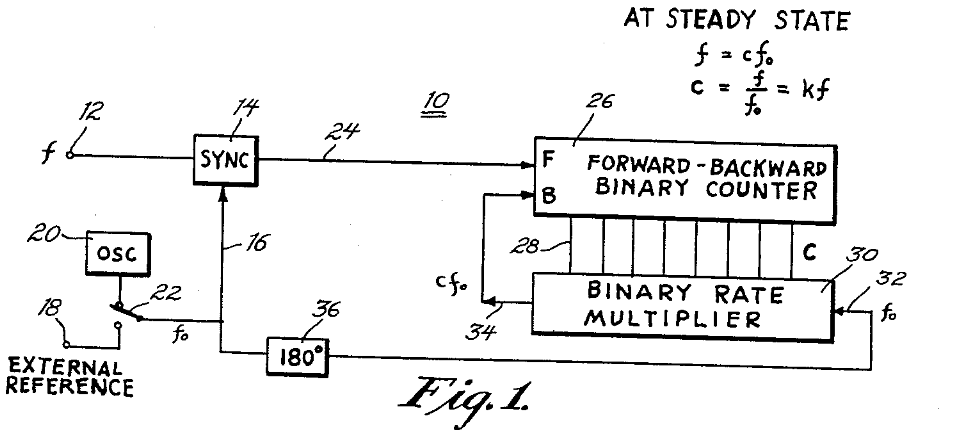
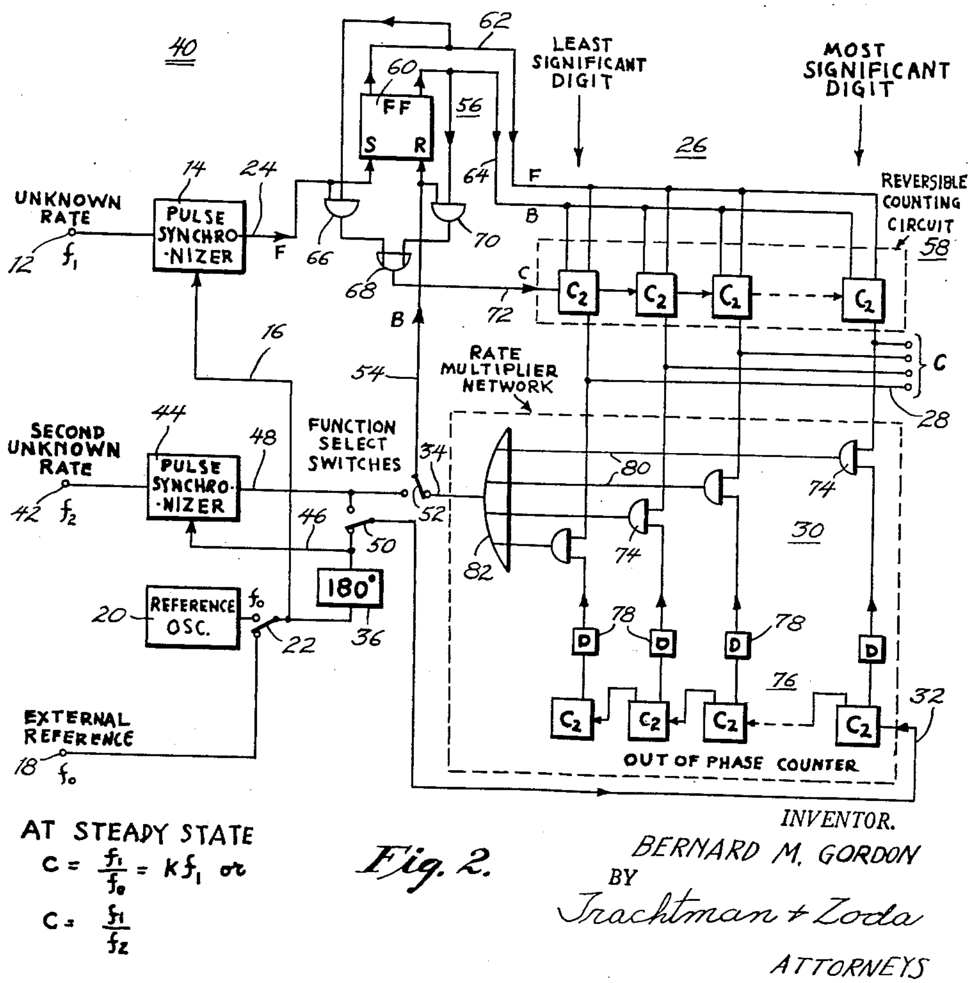
Fig. 2.
AT STEADY STATE
$$C = \frac{f_1}{f_0} = kf_1 \text{ or}$$
$$C = \frac{f_1}{f_2}$$
INVENTOR.
BERNARD M. GORDON
BY
Trachtman + Zoda
ATTORNEYS 2,951,986

SIGNAL COUNTING APPARATUS

Bernard M. Gordon, Newton, Mass., assignor to Epsco, Incorporated, Boston, Mass., a corporation of Massachusetts Filed Oct. 9, 1956, Ser. No. 614,845

14 Claims. (Cl. 324—79)

The invention relates to a signal counting apparatus, and more particularly to a signal counting and frequency meter apparatus for receiving information signals and delivering a responsive output signal. This application is a continuation in part of my application for U.S. Letters Patent Serial No. 542,875, filed on October 26, 1955, and entitled Frequency Meter.

Heretofore, signal responsive counting and frequency measuring devices have been of complex construction utilizing sampling techniques for delivering information at a later time. Such equipment besides being complex and expensive has not been able to deliver an output signal responsive to the information signal during the time of its delivery. This has reduced the usefulness and efficiency of such equipment. In the case where information relating to the frequency of a train of signals is to be delivered in binary form, it has been necessary to utilize additional conversion equipment which has also increased the cost and reduced the efficiency of such apparatus.

It is therefore an object of the invention to provide a new and improved signal counting apparatus which is simple, inexpensive and efficient in operation and construction.

Another object of the invention is to provide a new and improved signal counting apparatus which continuously delivers an output signal responsive to the input signals.

Another object of the invention is to provide a new and improved signal counting apparatus which does not require special converting apparatus for delivering its information in binary form.

Another object of the invention is to provide a new and improved signal counting apparatus which can follow and measure changes in frequency of an input signal.

Another object of the invention is to provide a new and improved frequency meter which can measure the ratios of the frequency of two input signals.

Another object of the invention is to provide a new and improved differential totalizer giving the difference of signals presented to its input terminals.

Another object of the invention is to provide a new and improved signal counting apparatus provided with timing means for increasing its efficiency and accuracy.

Another object of the invention is to provide a new and improved signal counting apparatus having a control circuit assuring the delivery of count signals to the reversible counting device after it is in its proper state.

Another object of the invention is to provide a new and improved signal counting apparatus which can be used as a frequency meter, frequency ratio meter, difference totalizer and parameter rate scaling unit.

The above objects as well as many other objects will become apparent as the following description of the invention is read in conjunction with the drawings, in which:

Figure 1 is a block diagram illustrating an embodiment of the invention, and

Figure 2 is a block diagram illustrating in greater detail a modified form of the invention shown in Figure 1.

Like numerals designate like parts throughout the several views.

Refer now to the Figure 1 which illustrates in block form a signal counting apparatus 10 embodying the invention.

The signal counting apparatus 10 has an information input terminal 12 which is adapted to receive signals for delivery to a timing means synchronizer 14. The synchronizer 14 receives timing signals having a frequency $f_0$ over a line 16. The position of a selector switch 22 determines whether the timing signals on line 16 are received from an external source at the input terminal 18 or from an internal oscillator source 20. The frequency $f_0$ of the timing signal is greater than the maximum frequency $f$ of the information input signal which is to be delivered to the terminal 12.

The timing signals on line 16 energize the synchronizer 14 for timing delivery of signals from the input terminal 12 to the output line 24 of the synchronizer 14.

The output line 24 delivers pulse signals to the forward count input lead of a reversible binary counter 26 causing the counter 26 to count in the forward direction. The reversible counter 26 is the type known in the art having a plurality of output leads 28. The output leads 28 of the binary counter 26 deliver signals representing the count C of the counter 26.

The output leads 28 of the counter 26 are connected to the rate control lines of the binary rate multiplier 30. The binary rate multipler 30 is of the type well known in the art having an input line 32 receiving activating pulse signals, and an output line 34 delivering output pulse signals at a rate which is the product of the rate of the activating signals and the rate control signal on the control leads 28.

The timing signals on the line 16 are delivered to the input line 32 of the binary rate multiplier 30 through a phasing device 36. The phasing device may change the phase of the timing signals by 180 degrees or in any other desirable amount.

The pulse signals delivered to the output line 34 of the binary rate multiplier 30 excite the backward count input of the binary counter 26. These signals cause the counter to count in the backward direction.

In the operation of the signal counting apparatus 10 as a frequency meter, an information signal having a frequency $f$ which is to be determined is delivered to the input terminal 12. The synchronizer 14 times the delivery of pulse signals to its output line 24 for each corresponding pulse or cycle of the input signal on terminal 12. Each pulse signal delivered to the forward count input of the binary counter 26 causes it to count in the forward direction.

The count C of the counter 26 is delivered over the lines 28 to the rate control lines of the binary rate multiplier 30. The binary rate multiplier which is actuated by the timing signals of frequency $f_0$, delivers output pulses on its line 34 which has a rate equal to the product $(Cf_0)$ of the count C of the binary counter 26 and the frequency $f_0$ of the activating signals to the binary rate multiplier 30.

The output signals from the binary rate multiplier 30 on line 34 are delivered to the backward count input of the counter 28 causing it to count in the backward direction. It is noted, however, that the signals delivered to the backward count input of the counter 26 are out of phase with the delivery of pulse signals over line 24 to the forward count input of the counter 26. This is accomplished by the phasing device 36 which alters the phase of the timing signals. This prevents the delivery of forward and backward count pulses to the binary counter at the same time.

When the binary counter 28 reaches its steady state condition, the rate of signals delivered to its forward count input is equal to the rate of signals delivered to its backward count input thereby maintaining its count substantially constant. This condition may be represented as follows:

$$f=Cf_0$$
$$C=f/f_0=kf$$

where $k$ is equal to $1/f_0$.

Thus, it is evident that the output count C of the binary counter 26 at its steady state condition is proportional to the frequency of the information signal delivered to the input terminal 12. It is also noted that the apparatus 10 may be used as a parameter rate scaling unit by controlling the frequency $f_0$ of the timing signal. The apparatus 10 receives the information signals in frequency form at the input terminal 12 and delivers at its output leads 28 a digital signal proportional to the frequency $f$ of the input information signal.

It is noted, that the signal counting apparatus 10 operating as a frequency meter, as described above, is of the closed loop type which is actuated by feed back signals so that at steady state condition the output binary signal C corresponds to the frequency $f$ of the signal delivered at the input terminal 12. As the frequency $f$ of the signal delivered at the input terminal 12 changes, the counter 26 is caused to change its count C until it is again at a steady state condition. At this time the output signal C again corresponds to and is proportional to the frequency $f$ of the input signal at terminal 12.

In the case where the frequency $f$ at the input terminal 12 changes at a rate slow enough so that the count of the counter 26 follows it, the output lines 28 continuously deliver output information C which accurately represents the input frequency $f$ during its change.

In the case where the frequency changes quickly so that the counter 26 is caused to lag behind, the count C of the counter 26 is being corrected immediately upon the frequency shift and assumes the proper proportional value after a delay depending upon the amount and rate of change in the input frequency $f$ at the terminal 12.

The great versatility of the apparatus 10 in its illustrated form and with slight modification will be obvious to those skilled in the art.

The Figure 2 illustrates in greater detail a signal counting apparatus 40 which is a modified form of the apparatus 10 shown in Figure 1.

The information signals delivered to the input terminal 12 are delivered to the pulse synchronizer 14. The pulse synchronizer 14 may be a flip-flop circuit which is set to its first state by receipt of a signal from the terminal 12 and reset to its second state by the occurrence of a timing or synchronizing signal on the line 16. Each time the flip-flop circuit is reset, an output signal is delivered to the forward count line 24. Thus, if the pulse synchronizer 14 is not originally set to its first state, a synchronizing signal will not reset and an output signal is not delivered to the forward count line 24.

As indicated above, the frequency of the timing signal on line 16 is greater than the maximum frequency of the information input signal supplied on terminal 12. It follows, therefore, that every input pulse applied on terminal 12 and coupled therefrom to the set input of a conventional flip-flop circuit sets the flip-flop to the first state. The next synchronizing pulse on terminal 16 is then effective in resetting the flip-flop to its second stable state. In response to being reset, an output pulse is delivered on line 24 in time synchronism with the synchronizing pulses applied on line 16. It is evident, of course, that not every synchronizing pulse will be effective in resetting the flip-flop, a synchronized output pulse being provided on line 24 for each input pulse applied on terminal 12.

A second information input terminal 42 may also be provided for receiving and delivering information signals to a pulse synchronizer 44 similar to the synchronizer 14. The pulse synchronizer 44, however, is energized by timing signals delivered to the line 46. The timing signals on line 46 are derived from the line 16 through the phasing device 36.

Thus, the signals on the input terminal 42 are delivered by the synchronizer 44 to its output line 48 out of phase with the signals delivered by the synchronizer 14 to the output line 24.

The output line 48 of the synchronizer 44 may be connected by a function selecting switch 50 to the input terminal 32 of the binary rate multiplier 30. The output line 48 may also be connected by a function selecting switch 52 with the backward count input line 54.

The forward-backward binary counter 26 of Figure 2 includes a control circuit 56 and a reversible counting circuit 58. The control circuit 56 comprises a bistable or flip-flop circuit 60 which is set to its first state by a signal on the forward count line 24, and reset to its second state by a signal on the backward count input line 54. When the flip-flop circuit 60 is in its first state, it delivers an output signal to its forward control line 62 conditioning the counting circuit 58 to count in the forward direction. When the flip-flop circuit 60 is in its second state, it delivers an output signal to its backward control line 64 conditioning the counting circuit 58 to count in the backward direction.

The flip-flop circuit 60 in its first state also conditions a forward count gate 66 to pass signals from the forward count line 24 to a count input buffer 68. When the flip-flop 60 is in its second state, it similarly conditions a backward count gate 70 to deliver signals on the backward count line 54 to the count input buffer 68. The signals from the buffer 68 are delivered to the count input lead 72 of the reversible counting circuit 58.

The count of the counting circuit 58 is delivered in decimal or binary form to the plurality of output lines 28. The signals on the plurality of output lines 28 also respectively condition a plurality of gates 74 of the binary rate multiplier 30. Signals produced by the out of phase counter 76 of the binary rate multiplier 30 pass through respective differentiators 78 to corresponding gates 74.

Upon receipt of pulse signals from the differentiators 78, the gates 74 which are conditioned for passing such signals deliver them to respective output lines 80. The signals on output lines 80 are delivered to a buffer 82 which passes them to the output line 34 of the binary rate multiplier 30. With the function selecting switch 52 in position illustrated, the signals on the output line 34 are delivered to the backward count line 54.

*Operation as frequency meter*

With operation of the signal counting apparatus 40 as a frequency meter, the functions selecting switches 50 and 52 are positioned in the manner illustrated by Figure 2. The input signal, the frequency $f_1$ of which is to be determined, is delivered to the input terminal 12. The synchronizer 14 delivers a timed pulse to the forward count line 24 corresponding to each cycle or pulse of the input signal. If the flip-flop circuit 60 of the control circuit 56 is in its second state, the forward count gate 66 is not conditioned for passing signals on the line 24. The signal on line 24, however, is delivered to the flip-flop 60 causing it to assume its first state. This conditions the forward count 66 to pass succeeding signals on the forward count line 24 until the flip-flop 60 is reset to its second state. The signals passed by the forward gate 66 are delivered through the buffer 66 to the count input lead 72 of the reversible counting circuit 58. Since the flip-flop circuit 60 of the control circuit 56 is in its first state, the counting circuit 58 counts in the forward direction.

When a signal is delivered to the backward count line 54, it is not passed to the count input lead 72 of the counting circuit 58, since the backward count gate 70 is inhibited while the flip-flop 60 is in its first state. The pulse signal on the backward line 54, however, resets the flip-flop 60 to its second state, so that the succeeding pulses on the line 54 are passed by the backward gate 70 until the flip-flop circuit 60 is set to its first state by the occurrence of a signal on the forward count line 24. The signals passed by the gate 70 are also delivered to the count input line 72 of the counting circuit 58. Since under these conditions the control circuit 56 is in its second state, the counting circuit 58 counts in the backward direction.

Because the rate multiplier network 30 receives activating signals which are out of phase with the activating signals on line 16, the signals delivered to the backward count line 54 are out of phase with signals delivered to the forward input line 24. Of course, this relationship can also be achieved by placing the phasing network 36 in the backward count line 34 while exciting the input lead 32 with the signals directly received from line 16, or by placing the network 36 in the line 16 to the synchronizer 14.

This out of phase relationship between the signals on the forward count line 24 and backward count line 54 prevents the simultaneous delivery of setting and resetting signals to the flip-flop circuit 60.

An important result of the control circuit 56 of the counter 26 is that when signals are alternatively received by the forward count line 24 and the backward control line 54, the flip-flop circuit 60 is alternately energized from its first to its second state, but the control gate 66 and 70 prevent the delivery of count input signals to the lead 72 of the reversible counting circuit 58. This is of great advantage since it prevents the alternation and fluctuation back and forth in the count of the counting circuit 58 by one unit. This would otherwise occur during the equilibrium condition of the signal counting network. Its prevention is important since if the count of the counter 26 is varying between 1999 and 2000, this alternation may result in the erroneous count of 1000 or 2999. Such indeterminacy of the count is also especially evident and annoying when it is visibly displayed by the apparatus as by a drum indicator. When more than one consecutive signal on the forward or backward count lines 24, 54 occurs before the delivery of a pulse on the other forward or control line, such signals are delivered to the counting circuit 58 changing its count.

It is also noted that the control circuit 56 operates to prevent the delivery of an input signal to the lead 72 of the counting circuit 58 unless the counting circuit 58 has been reset to count in the direction required by the signal presented to the control circuit 56.

As previously explained in connection with Figure 1, the signal counting apparatus when operating as a frequency meter achieves a steady state condition when the rate of forward signals delivered to the forward line 24 is equal to the rate of signals delivered to the backward line 54. Under these conditions, a stabilized count C is achieved by the counting circuit 58. As previously explained, the following relationship holds during the steady state condition:

$$C=f_1/f_0=kf_1$$

where $$k=1/f_0$$

*Operation as frequency ratio meter*

When the signal counting apparatus is to be used as a frequency ratio device, the function selecting switch 50 is set to connect the output line 48 with input line 32 of the multiplier network while disconnecting the line 32 from the source of timing signals on line 46. The switch 52 connects the line 34 with the line 54.

The signals having respective unknown rates or frequencies $f_1$ and $f_2$ are respectively delivered to the information input terminals 12 and 42. The signals on the input terminals 12 and 42 are respectively passed by the synchronizers 14 and 44 to the forward count line 24 and the input line 32 of the rate multiplier network 30.

Since the synchronizers 14 and 44 are respectively energized by the signals which are out of phase, their output signals are also delivered in out of phase relationship.

The control circuit 56 of the counter 26 operates in the manner previously described to deliver count input signals to the lead 72 of the counting circuit 58 after it has been appropriately conditioned for either a forward or backward counting operation.

The rate of activating signals delivered to the input line 32 of the rate multiplier 30 has the frequency $f_2$ of the information signal at the input terminal 42. Thus, the steady state equilibrium is achieved upon the following conditions:

$$f_1=Cf_2$$

or $$C=f_1/f_2$$

Thus, the apparatus 40 delivers an output count signal C which is the ratio of the input signals. Should the ratio of the signal change, the apparatus will change its output count C to conform with the new value. Of course, the degree of conformance during the change of the frequency ratio, will depend upon the amount and rate of change of the frequency of the information signals, as explained in connection with Figure 1.

*Operation as differential totalizer*

When the signal counting apparatus 40 is to be used as a differential totalizer, the function selecting switch 52 is set so that the backward count line 54 receives signals from the output line 48 of the pulse synchronizer 44. The information signals delivered respectively to the input terminals 12 and 42 are under such conditions timed by the synchronizers 14 and 44 and delivered in out of phase relationship to the forward count line 24 and the backward count line 54.

If the rate of signals delivered to the forward and backward lines 24 and 54 are equal, the control circuit 56 of the counter 26 does not deliver count input signals to the lead 72 of the counting circuit 58.

If the rate of the signals delivered to the forward line 24 is greater than the rate of signals on the backward line 54, the signals will be delivered by the control circuit 56 so that the count C of the counting circuit 58 increases. Conversely, when the rate of signals delivered to the backward count line 54 is greater than the rate of signals delivered to the forward count line 24, the counting circuit 58 will be caused to count in the backward direction decreasing its count C.

Since in its totalizing action, the control circuit 56 switching from one state to its other alternately loses one forward count signal and one backward count signal, this does not result in a cumulative error but in a compensating effect.

After any period of time, the count C of the counter 26 delivered to the output lines 28 is the total difference between the number of signal cycles or pulses delivered to the respective input terminals 12 and 42.

*Operation as rate scaling unit*

The signal counting device may be used as a parameter or rate scaling unit when its function selecting switches are set as illustrated in Figure 2, by varying the reference frequency $f_0$ to determine the scaling factor.

It will also be obvious how the signal counting apparatus 40 may be used as a forward counting counter, a backward counting counter, a continuous visual rate monitor, and arbitrary synchronous non-synchronous events per unit time averaging devices.

It will, of course, be understood that the description and drawings herein contained, are illustrative merely, and that various modifications and changes may be made in the structure disclosed without departing from the spirit of the invention.

What is claimed is:

1. A frequency meter comprising an information input terminal for receiving pulse signals at a frequency ($f$) to be determined; a forward-backward binary counting device having forward and backward control leads, a count input lead, and a plurality of output leads delivering an output count signal (C); buffer means having its output coupled to said count input lead, first and second gating means having outputs coupled to inputs of said buffer means, a binary rate multiplier unit connected with the output leads of said counting device for controlling its rate and having an input line for receiving pulse signals at a predetermined frequency ($f_0$), and an output line delivering a product signal ($Cf_0$) to the count input lead of said counting device through said buffer means and said second gating means when enabled, so that at the steady state condition of said counting device its count (C) is proportional to the frequency of the pulse signals received at said input terminal; timing means energized by said pulse signals of frequency ($f_0$) to deliver signals received by said input terminal to the count input lead of said counting device through said buffer means and said first gating means when enabled, the latter signals being out of phase with the signals from said rate multiplier unit; and a flip-flop control circuit having a first input lead energized by signals from said timing means to assume its first state, a second input lead energized by signals from the output line of said rate multiplier unit to assume its second state, and first and second output lines respectively energizing the control leads of said counting device and coupling enabling potentials to said first and second gating means during mutually exclusive time intervals; said flip-flop circuit in its first and second states respectively conditioning said first and second gating means and said counting device for forward and backward counting operations respectively.

2. A counting apparatus comprising an information input terminal; a reversible counting device having forward and backward control leads, a count input lead, and an output; a rate multiplier unit controlled by the signals from the output of said counting device having an input line for receiving activating signals, and an output line; a control circuit energizing the control leads of said counting device including means for conditioning said counting device to count forward in response to the delivery of a signal from said input terminal, while conditioning said counting device to count backward in response to the delivery of a signal from the output line of said rate multiplier unit; means responsive to said counting device being conditioned to count forward for coupling signals from said input terminal to the count input lead of said counting device, and means responsive to said counting device being conditioned to count backward for coupling signals from the output line of said rate multiplier unit to the count input lead of said counting device.

3. A frequency meter comprising an information input terminal for receiving signals at a frequency to be determined; a reversible counting device having forward and backward control leads, a count input lead, and output leads; a rate multiplier unit connected with the output lead of said counting device for controlling the output rate of said unit, and having an input line for receiving signals at a predetermined frequency, and an output line; a bistable control circuit energizing the control leads of said counting device to count forward when in its first state and to count backward when in its second state; said control circuit assuming its first state in response to a signal delivered from said input terminal, while assuming its second state in response to a signal delivered by the output line of said rate multiplier unit; means responsive to said control circuit being in said first state for coupling the succeeding signals from the input terminal to the count input lead of said counting device until the delivery of a signal from the output line of said rate multiplier unit; and means responsive to said control circuit being in said second state for coupling the succeeding signals from the output line of said rate multiplier unit to the count input lead of said counting device until the delivery of a signal from said input terminal.

4. A frequency meter comprising an information input terminal for receiving discrete signals at a frequency to be determined; a reversible binary counting device having forward and backward control leads, a count input lead, and a plurality of output leads; a binary multiplier unit connected with the output leads of said counting device for controlling the output signal of said unit rate, and having an input line for receiving discrete activating signals at a predetermined frequency, and an output line; a bistable circuit energizing the control leads of said counting device to count forward when in its first state and to count backward when in its second state; said bistable circuit assuming its first state in response to a signal delivered to said input terminal, while assuming its second state in response to a signal delivered by the output line of said rate multiplier unit; a forward count gate conditioned for delivering signals from said input terminal to the count input lead of said counting device in response to said bistable circuit being in its first state; and a backward count gate conditioned for delivering signals from the output line of said rate multiplier unit in response to said bistable circuit being in its second state; said gates preventing the delivery to the count input lead of said counting device of the signals which actuate said bistable circuit from one to the other of its state.

5. A frequency meter comprising an information input terminal for receiving pulse signals at a frequency ($f$) to be determined; a forward-backward binary counting device having forward and backward control leads, a count input lead, and a plurality of output leads delivering an output count signal (C); a binary rate multiplier unit connected with the output leads of said counting device for controlling its rate and having an input line for receiving pulse signals at a predetermined frequency ($f_0$), and an output line delivering a product signal ($Cf_0$); a flip-flop circuit having a first input lead energized by signals from said input terminal to assume its first state, a second input lead energized by signals from the output line of said rate multiplier unit to assume its second state, and first and second output lines energizing the control leads of said counting device; said flip-flop circuit in its first and second states respectively conditioning said counting device for forward and backward counting operations; a forward count gate conditioned by the first output line of said flip-flop circuit when in its first state for delivering signals from said input terminal to the count input lead of said counting device; and a backward count gate conditioned by the second output line of said flip-flop circuit when in its second state for delivering signals from the output line of said rate multiplier unit to the count input lead of said counting device; said gates preventing the delivery to the count input lead of said counting device of the signals which actuate said bistable circuit from one to the other of its states; the count (C) of said counting device at its steady state condition being proportional to the frequency of the pulse signals received at said input terminal.

6. A counting apparatus comprising an information input terminal; a reversible counting device having forward and backward control leads, a count input lead receiving signals from said input terminal, and an output; a rate multiplier unit controlled by the signals from the output of said counting device having an input line for receiving activating signals, and an output line exciting the count input lead of said counting device; timing means preventing the simultaneous delivery of signals to the count input lead of said counting device from said input terminal and said rate multiplier unit; and a control circuit energizing the control leads of said counting device for conditioning said counting device to count forward with the delivery of a signal from said input terminal, while conditioning said counting device to count backward with the delivery of a signal from the output line of said rate multiplier unit; said control circuit including means for coupling signals from said input terminal to the count input lead of said counting device in response to said counting device being conditioned to count forward, while coupling signals from the output line of said rate multiplier unit to the count input lead of said counting device in response to said counting device being conditioned to count backward.

7. A frequency meter comprising an information input terminal for receiving signals at a frequency to be determined a reversible counting device having forward and backward control leads, a count input lead, and output leads; a rate multiplier unit connected with the output leads of said counting device for controlling its rate, and having an input line for receiving signals at a predetermined frequency, and an output line; timing means having an output line delivering the signals received by said input terminal out of phase with signals from the output line of said rate multiplier unit; a bistable control circuit energizing the control leads of said counting device to count forward when in its first state and to count backward when in its second state; said control circuit assuming its first state in response to a signal delivered to the output line of said timing means, while assuming its second state in response to a signal delivered by the output line of said rate multiplier unit; means responsive to said control circuit being in said first state for coupling the succeeding signals from the output line of said timing means to the count input lead of said counting device until the delivery of a signal from the output line of said rate multiplier unit; and means responsive to said control circuit being in said second state for coupling the succeeding signals from the output line of said rate multiplier unit to the count input lead of said counting device until the delivery of a signal from the output line of said timing device.

8. A frequency meter comprising an information input terminal for receiving discrete signals at a frequency to be determined; a reversible binary counting device having forward and backward control leads, a count input lead, and a plurality of output leads; a binary multiplier unit connected with the output leads of said counting device for controlling the output signal rate of said unit, and having an input line for receiving discrete activating signals at a predetermined frequency, and an output line; timing means energized by the activating signals received by said rate multiplier unit and having an output line delivering the signals received by said input terminal out of phase with the signals from the output line of said rate multiplier unit; a bistable circuit energizing the control leads of said counting device to count forward in response to said bistable circuit being in its first state and to count backward in response to said circuit being in its second state; said bistable circuit assuming its first state in response to a signal delivered to said input terminal, while assuming its second state in response to a signal delivered by the output line of said rate multiplier unit; a forward count gate conditioned for delivering signals from said input terminal to the count input lead of said counting device in response to said bistable circuit being in its first state; and a backward count gate conditioned for delivering signals from the output line of said rate multiplier unit to said counting device input lead in response to said bistable circuit being in its second state; said gates preventing the delivery to the count input lead of said counting device of the signals which actuate said bistable circuit from one to the other of its states.

9. A frequency meter comprising an information input terminal for receiving pulse signals at a frequency $(f)$ to be determined; a forward-backward binary counting device having forward and backward control leads, a count input lead, and a plurality of output leads delivering an output count signal (C); a binary rate multiplier unit connected with the output leads of said counting device for controlling the output signal rate of said unit and having an input line for receiving pulse signals at a predetermined frequency $(f_0)$, and an output line delivering a product signal $(Cf_0)$; timing means having an output line delivering the signals received by said information input terminal; said timing means being energized by said pulse signals of frequency $(f_0)$ and said pulse signals of frequency $(f)$ for delivering signals at its output line out of phase with the signals from the output line of said rate multiplier unit; a flip-flop circuit having a first input lead energized by signals from the output line of said timing means to assume its first state, a second input lead energized by signals from the output line of said rate multiplier unit to assume its second state, and first and second output lines energizing the control leads of said counting device; said flip-flop circuit in its first and second states respectively conditioning said counting device for forward and backward counting operations; a forward count gate conditioned by the first output line of said flip-flop circuit when in its first state for delivering signals from the output line of said timing means to the count input lead of said counting device; and a backward count gate conditioned by the second output line of said flip-flop circuit when in its second state for delivering signals from the output line of said rate multiplier unit to the count input lead of said counting device; said gates preventing the delivery to the count input lead of said counting device of the signals which actuate said bistable circuit from one to the other of its states; the count (C) of said counting device at its steady state condition being proportional to the frequency of the pulse signals received at said information input terminal.

10. In a counting apparatus with a reversible counting device; a bistable circuit having first and second input leads for respectively receiving forward and backward count signals, and assuming its first state when its first lead is energized and its second state when its second lead is energized; said bistable circuit energizing a counting device to count forward when in its first state and to count backward when in its second state; a forward count gate conditioned for delivering said forward count signals to said counter when said bistable circuit is in its first state; and a backward count gate conditioned for delivering said backward count signals to said counting device when said bistable circuit is in its second state; said gates preventing the delivery to the count input lead of said counting device of signals which actuate said bistable circuit from one to the other of its states.

11. The combination of claim 10 including timing means preventing the simultaneous delivery of count signals to the first and second input leads of said bistable circuit.

12. A counting apparatus comprising first and second input terminals; a reversible counting device having forward and backward control leads, a count input lead, and an output; and a control circuit energizing the control leads of said counting device for conditioning said counting device to count forward with the delivery of a signal from said first input terminal, while conditioning said counting device to count backward with the delivery of a signal from the second input terminal; said control circuit permitting delivery of signals from said first input terminal to the count input lead of said counting device after said counting device is conditioned to count forward, while permitting the delivery of signals from said second input terminal to the count input lead of said counting device after said counting device is conditioned to count backward.

13. A counting apparatus comprising first and second information input terminals; a reversible counting device having forward and backward control leads, a count input lead, and an output lead; timing means respectively delivering signals from said first and second input terminals to the count input lead of said counting device so that the signals delivered from the first input terminal are out of phase with the signals delivered from said second input terminal; and a control circuit energizing the control leads of said counting device for conditioning said counting device to count forward in response to the delivery of a signal from said first input terminal, while conditioning said counting device to count backward in response to the delivery of a signal from the second input terminal; said control circuit coupling signals from said first input terminal to the count input lead of said counting device only after said counting device is conditioned to count forward, while coupling signals from said second input terminal to the count input lead of said counting device only after said counting device is conditioned to count backward.

14. A difference counting apparatus comprising first and second information input terminals for respectively receiving pulse signals; a reversible counting device having forward and backward control leads, a count input lead; timing means energized by pulse signals having a predetermined frequency ($f_0$) greater than the rate of signals received by either of said input terminals and having first and second output lines respectively delivering signals received by said first and second input terminals so that the signals delivered to the first output line are out of phase with the signals delivered to the second output line; a bistable circuit energizing the control leads of said counting device to count forward when in its first state and to count backward when in its second state; said bistable circuit assuming its first state in response to a signal delivered by the first output line of said timing means, while assuming its second state in response to a signal delivered by the second output line of said timing means; a forward count gate conditioned for delivering signals from said first output line of said timing means to said count input lead in response to said bistable circuit being in its first state; and a backward count gate conditioned for delivering signals from the second output line of said timing means to said count input lead in response to said bistable circuit being in its second state; said gates preventing the delivery to the count input lead of said counting device of said signals from the output lines of said timing device which actuate said bistable circuit from one to the other of its states.

References Cited in the file of this patent

UNITED STATES PATENTS

| | | |
|---|---|---|
| 2,584,866 | Gray | Feb. 5, 1952 |
| 2,677,104 | Chase | Apr. 27, 1954 |
| 2,700,750 | Dickinson | Jan. 25, 1955 |

OTHER REFERENCES

"An Operational Digital Feedback Divider," article in Transactions of the I.R.E., March 1954.